United States Patent [19]
Knill et al.

[11] 4,075,027
[45] Feb. 21, 1978

[54] CONSOLIDATION OF PARTICULATE MATERIALS

[75] Inventors: Kenneth George Knill, Ripley; Michael Kendal Bowler, Duffield; Peter Hambleton, Belper, all of England

[73] Assignee: Charcon Products Limited, Hulland Ward, England

[21] Appl. No.: 657,188

[22] Filed: Feb. 11, 1976

[30] Foreign Application Priority Data

Feb. 14, 1975 United Kingdom ................ 6246/75

[51] Int. Cl.$^2$ .............................................. C04B 7/02
[52] U.S. Cl. .................................... 106/99; 75/44 R; 75/44 S
[58] Field of Search ................ 106/99, 97; 75/44 R, 75/44 S

[56] References Cited

U.S. PATENT DOCUMENTS

| | | | |
|---|---|---|---|
| 2,802,732 | 8/1957 | Crolius | 75/44 R |
| 3,316,083 | 4/1967 | Parsons | 75/44 R |
| 3,827,895 | 8/1974 | Copeland | 106/99 |
| 3,864,092 | 2/1975 | Ravitz | 75/44 R |

*Primary Examiner*—J. Poer
*Attorney, Agent, or Firm*—Marshall & Yeasting

[57] ABSTRACT

A method of producing briquettes comprising cold pressing at relatively low pressures of a homogeneous mixture consisting of at least a fibrous material which acts as both a filler and a binder together with metallic particles such as iron borings or other machine shop waste. The fibrous material is preferably paper in pulp form. The composition may include cement and/or additional material in pulverant form or dust form selected from coke, coal, limestone and fluospar.

20 Claims, No Drawings

CONSOLIDATION OF PARTICULATE MATERIALS

The invention relates to the consolidation of particulate materials into blocks or briquettes and is especially, but not exclusively, applicable to the production of briquettes from scrap iron or steel.

In industries where large quantities of components are machined and drilled from cast iron or steel, substantial quantities of metal borings, filings and the like are produced. Currently most of these borings constitute waste material though a certain proportion are compressed into briquettes and re-utilised in the production of further iron or steel. The use of briquettes of old iron in this way is advantageous in that in many instances the composition of the briquettes is known precisely whereas other scrap iron which is re-cycled is frequently of indeterminate composition.

A difficulty with existing briquettes of this kind is that the degree of consolidation of the iron or steel borings or the like is insufficient so that the briquettes break up before reaching the melting zone of the cupola or furnace, and the individual borings, being light in weight, are carried away up the flue. In order to overcome this difficulty it has been proposed to incorporate a cement in briquettes of this kind but such attempts have not hitherto been successful as the overall iron content in the resulting briquettes has been too low.

It is an object of the present invention to provide methods by means of which briquettes may be produced from metallic scrap in the form of borings, filings or the like which do not suffer from the disadvantages of previously proposed briquettes of this kind. The invention also resides in the briquettes so produced.

In the following specification and claims reference will be made for the sake of simplicity to "metallic particles", "metallic borings" or "iron borings", but it is to be understood that the invention is equally applicable to filings or other particles of iron or steel, and could also be applied to other metallic materials such as metals, alloys, metallic oxides or the like.

In general terms the invention provides a method of producing briquettes by compacting a mixture of metallic particles, a filler, and a material which acts in the nature of a cement.

The filler may comprise metallic dust which is normally present where the metallic particles comprise borings derived from machining operations. In some instances the dust present with the borings may in itself suffice as the filler but in other instances the addition of further metallic dust may be advantageous. It will be appreciated that the nature of the borings will vary as regards particle size and as regards the proportion of dust present depending on their source. Most metallic borings contain up to about 20% by weight of dust, that is of material which will pass a No. 14 sieve (1.2 mm. square mesh).

For purposes of clarity the term "borings" will be used in the remainder of this specification and in the appended claims to refer to borings excluding any dust and the term "dust" will be used to include all material which will pass a No. 14 sieve (1.2 mm square mesh).

The material acting in the nature of a cement may comprise cement as such or may comprise other material which acts in the nature of a binder. One such material is shredded fibrous material such as paper, textile waste or peat. For purposes of clarity the term "binder" will be used in the remainder of this specification and in the appended claims to embrace both cement as such and other binders, and the term "cement" will be used in a narrow sense to refer to cement as such alone.

Thus according to one aspect of the invention there is provided a method of producing briquettes comprising compacting a homogeneous mixture of metallic particles, metallic dust of the same material as the particles, fibrous material and cement. The metallic dust acts as a filler and the fibrous material acts both as a filler and as a binder.

Alternatively the method may comprise compacting a homogeneous mixture of metallic particles, fibrous material and cement. In this case the fibrous material acts as both a filler and a binder.

In some cases the method may comprise compacting a homogeneous mixture of metallic particles and fibrous material alone, the fibrous material acting as both a filler and a binder and eliminating the need for cement as such.

It will be appreciated that the proportions of the various constituents will be varied depending on the nature of the metallic particles and the particular fibrous material utilised.

The invention also provides a briquette comprising a consolidated mass produced by any of the methods referred to above.

Preferably the borings and filler constitute from 80-95% by weight of the briquette, not more than 50% by weight consisting of the filler.

Preferably the briquette contains up to 5% of limestone, fluospar, and/or coke or coal. Where cement is present it may comprise Portland cement or a high alumina cement, preferably in an amount of not less than 5% by weight.

Various embodiments of the invention will now be described in more detail, it being understood that these are illustrative examples only and are not intended to limit the scope of the invention.

EXAMPLE 1

A briquette was formed by consolidation of a mixture of iron borings, iron dust, fibrous material and cement, together with certain additional non-metallic constituents. The borings were initially sieved or otherwise graded to eliminate those of an unduly large size. The iron dust, which acts as a filler was also sieved to ensure that it conformed to a predetermined average particle size. Iron borings forming the residue from machining operations are normally of generally elongated shape and when mixed together a multiplicity of voids are formed between the adjacent borings. The iron dust serves to fill these voids and thereby allow a high degree of consolidation of the pressed mass to be achieved. Thus the quantity of filler utilised will vary to some extent depending on the precise nature of the iron borings and hence the degree to which voids are present in a consolidated mass of the borings alone. It will be appreciated that all or a substantial proportion of the iron dust will be included with the borings/dust mixture supplied from the machine shop or the like from which these materials are obtained.

Preferably the percentage of iron borings and iron dust filler should be around 80-95% by weight of the total mixture, the remaining 5-20% consisting of additional constituents, fibrous material and cement. There is preferably no less than 5% cement and no less than 0.5% fibrous material (usually paper pulp). Preferably also no more than 50% by weight of the mixture consists of filler, additional constituents and fibrous material, of which from zero to 5% may comprise the additional constituents and from 0.5-3% fibrous material. As the minimum cement content is 5% the minimum percentage by weight of iron borings is therefore 42%.

A typical composition is as follows, the percentages given being by weight:
  Iron borings—60%
  Iron dust—30%
  Fibrous material—1.5%
  Cement—7%
  Additional Constituents—1.5%

The additional constituents may include limestone, fluorspar and/or coke or coal. Any one of these fillers may be present in an amount up to 5% by weight of the total mixture but the total content of additional constituents is preferably not in excess of 5%. The addition of limestone is advantageous in that it forms a flux which floats on the molten iron when the briquettes are subsequently used in the production of iron in a cupola. The flux attracts impurities and is beneficial in iron production. The flux produced by limestone is however rather thick for best results and a more satisfactory flux can be produced by utilising fluorspar. Alternatively a small proportion of fluorspar can be incorporated in the limestone. Utilisation of these materials has the dual benefit of providing a filler in the briquette and a flux generator during the subsequent iron-producing process.

Where coke or coal is included as an additional constituent this also serves a dual purpose as a filler and as a carboniser; the coke or coal burns in the cupola during iron production and therefore generators heat and creates carbon which is a beneficial constituent of the eventual cast iron produced. The coke or coal may be in pulverised or dust form. Where the materials to be used in producing the eventual iron include waste steel it is necessary to include a carboniser such as coke or coal as the steel has insufficient carbon to produce a satisfactory grade of cast iron.

The additional constituents may have a partial iron content; for example they may include ferric sand, that is a mixture of iron and sand which is a waste product of shot-blasting processes.

The cement constituent preferably consists of high alumina cement. This has a high melting point compared with conventional Portland or other cements, and briquettes bonded together by high alumina cement are therefore capable of travelling further down into the hot regions of the cupola before the cement decomposes and releases the iron particles.

The mixture from which the briquettes are to be produced is thoroughly mixed in a suitable mixing machine and is then pressed at atmospheric temperature to form a consolidated briquette. The pressing pressure may vary from about ½ ton per square inch up to any pressure of which the pressing apparatus is capable, though in general the pressure will not normally exceed 3 tons per square inch. Satisfactory results can be achieved with pressing pressures of the order of ¾-1¼ tons per square inch. After removal from the press the consolidated product is air dried at ambient temperature.

Before mixing of the materials prior to pressing a de-oiling operation may require to be carried out to remove traces of oil, grease and the like from the iron borings and the iron dust. This may be achieved in any conventional manner, for example by immersing the borings and the dust in a suitable detergent.

Generally a single large block will be produced at each pressing operation, the large block preferably having a number of grooves or depressions in at least one surface so that it may be broken down into smaller more easily handled units.

EXAMPLE II

A briquette was formed by consolidation of a mixture of metallic particles, fibrous material and cement. The metallic particles comprised iron oxide in granulated form, being waste material from shot blasting or pickling processes, and the fibrous material comprised paper in pulp form. Preferably the percentage of metallic particles is from 65-94% by weight of the mixture, there being from 1-5% by weight of paper pulp and from 5-30% by weight of cement.

Limestone, fluorspar and/or coke or coal are preferably included as additional constituents for the reasons and in the proportions referred to in Example I, and the various constituents are mixed together and consolidated by pressing as described in Example I.

In this example the paper pulp acts primarily as a filler and is beneficial in that it is burnt off when the briquette is fed into a furnace but does not produce constituents which contribute to the production of slag. The paper also improves the mechanical strength of the briquette and introduces a degree of flexibility which assists in holding the briquette together during handling and renders it less brittle than briquettes in which no paper or other fibrous material is present.

EXAMPLE III

A briquette was formed by consolidation of a homogeneous mixture of iron borings, iron dust, fibrous material and additional constituents. In this case the iron dust acts as a filler and the fibrous material as a binder and it has been found that by using these constituents in suitable proportions the need for inclusion of cement as such is avoided.

The iron borings were first graded as in Example I and the iron dust was sieved so that the total dust content would pass a No. 14 sieve (1.2 mm square mesh) and approximately 40% of the dust content would pass a 600 micron sieve. The proportion of dust in the borings is preferably in the region of 20% by weight of the borings/dust mixture which corresponds approximately to the percentage present in normal machine shop waste.

Preferably the percentage of iron borings and dust is from 80-95% of the weight of the mixture, there being from 0.5-3% of fibrous material and from 4.5-17% of additional constituents. The fibrous material preferably comprises paper in pulp form and the additional constituents preferably comprise limestone and coke or coal dust in percentages of 0.5-2% by weight of limestone and 4-15% by weight of coke or coal dust. The limestone may include a small quantity of fluorspar as a trace element.

A typical composition is as follows, the percentages given being by weight:
  Iron borings and iron dust—85%
  Coke or coal—12%
  Limestone—2%
  Paper—1%

The paper must be in fibrous form for which purpose it is formed into pulp by the addition of water or other liquid. This serves not only to break down the paper to pulp form to release the fibres, but also facilitates dispersion of the fibres in the mixture of borings and other constituents and improves the consolidation and mechanical strength of the final briquette. The preferred pulp solution comprises 6% by weight of paper to 94% by weight of water, though other solutions may be used depending on requirements. Moreover liquids other than water could be used to form the pulp solution if desired. The fibrous constituent of the mixtures used in Examples I and II is preferably produced in the same manner but it should be appreciated that fibrous materials other than paper pulp could be used and may require different treatment to release the fibrous properties. Examples of alternative materials are textile materials and peat. The materials used must of course be such that on burning the furnace they do not leave a residue which increases the impurities in the iron produced or which increases slag production. They should also preferably not require the application of substantial heat for decomposition as this would reduce the thermal efficiency of the process.

The coke or coal and limestone constituents are preferably in dust form having particle sizes from ⅛ inch to 10 microns. The addition of coke and/or coal dust is advantageous in that it is combustible and thus adds to the heat in the furnace and it has a high carbon content and thus has a carburizing effect on the iron. Limestone is normally added to the furnace to form a flux which attracts impurities and the inclusion of the coke/coal and limestone as fillers in the briquette thus has the benefit that quantity of coke required as fuel for the furnace is reduced and the separate addition of limestone is not required. The iron content of the briquette is also such that the separate addition of pig iron usually required at the foundry is reduced or eliminated, the only constituents requiring to be inserted in the furnace being briquettes and the usual coke for smelting.

In forming the briquettes the constituents are mixed together to form a homogeneous mixture which is then pressed at ambient temperature, removed from the press and air dried. The addition of heat for drying purposes could be employed but has been found to reduce the strength of the final briquette.

A surprising feature of the briquettes described above is that a binding or cementing effect is achieved without the use of cement as such. The reasons for this are not fully understood but it is believed this may be due to one or more of the following factors:
 (a) cementing effect of the limestone
 (b) oxidation (rusting) of the iron
 (c) the presence of starch in the paper
 (d) the mechanical binding effect of the fibres
 (e) some chemical reaction between certain constituents.

EXAMPLE IV

A briquette was formed as in Example III but omitting the coke or coal dust and the limestone, there being from 1-5% paper and from 95-99% of borings and iron dust. Pressing of the mixture at a relatively high pressure in excess of 2 tons/in² resulted in the production of satisfactory briquettes.

EXAMPLE V

A briquette was formed as in Example IV but omitting the iron dust. Satisfactory briquettes were produced using somewhat higher pressures than in Example IV.

The techniques described above result in the production of briquettes which are of a highly consolidated nature and which retain their form for a sufficiently long time during melting in the cupola. The briquettes also have a very high iron content so that only a small proportion of the weight of the briquette does not contribute to the content of the iron produced using the briquettes.

We claim:
1. A briquette comprising a consolidated homogeneous mixture of metallic particles and 0.5-5.0% by weight of a fibrous material which acts both as a filler and as a binder.
2. A briquette according to claim 1 including a further filler in addition to said fibrous material.
3. A briquette according to claim 2 wherein said additional filler includes metallic dust of the same material as the particles.
4. A briquette according to claim 3 comprising 1-5% by weight of fibrous material and 95-99% by weight of metallic particles and metallic dust.
5. A briquette comprising a consolidated mass consisting of a homogeneous mixture of metallic particles, at least 0.5% by weight of a fibrous material and at least 5.0% by weight of cement.
6. A briquette according to claim 5 comprising 65-94% by weight of metallic particles, 1-5% by weight of fibrous material and 5-30% by weight of cement.
7. A briquette comprising a consolidated mass consisting of a homogeneous mixture of metallic particales, metallic dust of the same material as the particles, at least 0.5% by weight of fibrous material and at least 5.0% by weight of cement.
8. A briquette according to claim 7 wherein 80-95% by weight of the mixture consists of metallic borings and metallic dust.
9. A briquette according to claim 3 including additional non-metallic constituents selected from the group consisting of limestone and fluospar.
10. A briquette according to claim 9 wherein said additional constituents are in dust form.
11. A briquette according to claim 10 wherein said additional constituents have particle sizes from ⅛ inch to 10 microns.
12. A briquette according to claim 9 comprising 80-95% by weight of metallic particles and metallic dust, 0.5-3% by weight of fibrous material and 4.5-17% by weight of said additional constituents.
13. A briquette according to claim 12 wherein said additional constituents comprise 0.5-2% by weight of limestone and 4-15% by weight of coke or coal.
14. A briquette according to claim 9 wherein 5-20% by weight of the mixture comprises additional constituents, fibrous material and cement.
15. A briquette according to claim 14 wherein not more than 50% by weight of the mixture consists of metallic dust, said additional constituents and fibrous material of which from 0-5% comprises the additional constituents and from 0.5-3% the fibrous material.
16. A briquette according to claim 1 wherein said metallic particles comprises iron or steel borings or filings.
17. A briquette according to claim 7 wherein said metallic particles comprises iron or steel borings or filings.
18. A briquette according to claim 1 wherein said fibrous material comprises paper in pulp form.
19. A briquette according to claim 7 wherein said fibrous material comprises paper in pulp form.
20. A briquette according to claim 3 including additional non-metallic constituents selected from the group consisting of coke and coal.

* * * * *